United States Patent [19]

Kautz

[11] 3,725,689
[45] Apr. 3, 1973

[54] CELLULAR CORRELATION ARRAY

[75] Inventor: William H. Kautz, Woodside, Calif.

[73] Assignee: The United States of America as represented by the Secretary of the Navy

[22] Filed: Aug. 3, 1971

[21] Appl. No.: 168,654

[52] U.S. Cl. ............235/181, 235/150.53, 235/152, 235/164, 235/197, 307/232, 324/186
[51] Int. Cl. ................................................G06g 7/19
[58] Field of Search.........235/181, 183, 150.53, 152, 235/92 NT, 92 EL, 92 PL, 175, 176, 177; 340/146.2, 347 NT; 307/221, 232, 233, 235; 328/48, 156, 157, 158, 159, 160, 161; 324/186

[56] References Cited

UNITED STATES PATENTS

| | | | |
|---|---|---|---|
| 3,598,979 | 8/1971 | Moreau | 235/181 |
| 3,522,541 | 8/1970 | Gooding | 235/181 X |
| 3,036,775 | 5/1962 | McDermid et al. | 235/181 |
| 3,308,434 | 3/1967 | Glasson et al. | 235/181 |
| 3,510,669 | 5/1970 | Peraza | 235/181 X |
| 3,517,175 | 6/1970 | Williams | 235/177 |
| 3,426,296 | 2/1969 | Christiansen et al. | 235/92 PL |

OTHER PUBLICATIONS

Simmons: A constructive Analysis of the aperiodic Correlation Function IEEE Trans. Info. Th. Vol. 1T. 15 No. 3 May 1969 p. 340/345

Primary Examiner—Felix D. Gruber
Attorney—R. S. Sciascia et al.

[57] ABSTRACT

The cellular array is capable of cross-correlating two binary sequences and automatically determining the coordinates of the peak of the cross-correlation function. The array includes two input registers, a binary counting array, and several peripheral registers.

7 Claims, 1 Drawing Figure

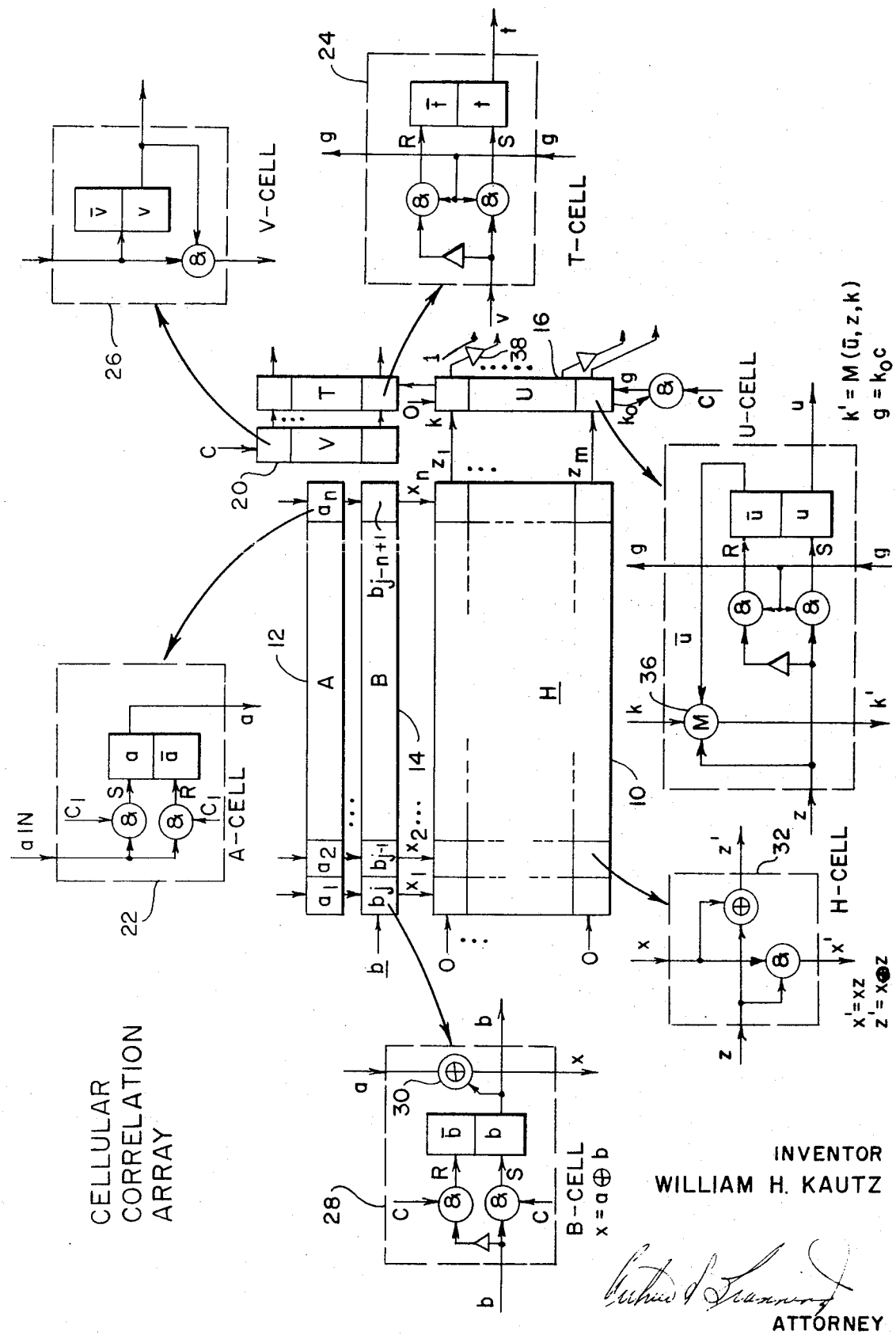

3,725,689

CELLULAR CORRELATION ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The cellular cross-correlator would find its main application in digital communication and ranging circuitry where it is desirable to compare two digital sequences for correlation, the outputs being the value of the peak of the cross-correlation function and the time of occurrence of peak value.

SUMMARY OF INVENTION

The invention is a cellular correlation array, for determining the cross-correlation between two binary sequences, which comprises two input registers one of which holds the sequence to be cross-correlated with a second sequence being shifted through a second register. The outputs of the two registers are combined in Exclusive-OR fashion into a binary counting array which adds the total number of 1's produced by the Exclusive-OR gates. The peak number totaled in the counting array is stored in an output register while the time of occurrence of the peak is stored in a second output register

OBJECTS

An object of the invention is to provide an improved circuit for binary correlation.

Another object is the provision of a cellular correlation array for automatic determination of the maximum correlation by the storage of the correlation peak and the time of occurrence of the peak.

Yet another object is the use of Exclusive-OR logic to perform the multiplying function in the cross-correlation process.

BRIEF DESCRIPTION OF THE DRAWING

The FIGURE shows the perferred embodiment of the invention.

DESCRIPTION OF THE PREFERRED EMBODIMENT

The cellular correlation array is shown in the FIGURE, and includes the array 10, as well as several peripheral registers: an input register 12, which does not necessarily shift but holds one of the two binary sequences to be correlated; a shifting input register 14, through which the secondary binary input sequence is shifted; an output U register 16, which contains at the end of the correlation period the peak value of the cross-correlation function; a T register 18, which contains at the end of the correlation period the time (abscissa value) at which the peak occurred; and a V binary counter 20.

The logic circuitry of a typical cell of the main array H and a typical cell of each of the various registers is shown in the FIGURE. Note in particular that the registers A and T and counter V are in all respects conventional. Each cell 22 of register A has an input $a_{in}$ which is read into the cell upon receipt of an input clock pulse $C_1$. Each cell 24 of register T reads in the output of the adjacent cell of counter V upon receipt of read pulse g. The cells 26 of counter V are advanced by receipt of a count pulse from the previous cell, thereby storing the total number of clock pulses or time. Register B is a standard shift register, each cell 28 of which is augmented with an Exclusive-OR gate 30 driven by corresponding cells of the A and B registers. It is the set of these Exclusive-OR gates which act as comparing means in that they perform the multiplication operation required for correlation. Register U is a standard register, augmented with a cascade of majority gates for performing a comparison operation, to be described in detail below.

We suppose that the array is intended to cross-correlate two two-valued sequences, a finite sequence $\alpha = (\alpha_1, \alpha_2, \ldots \alpha_n)$ of length $n$, and a periodic sequence $\beta = (\beta_1, \beta_2, \ldots \beta_N, \beta_1, \ldots )$ of period $N$, each term of each of which is either $+1$ or $-1$. Actually, the sequence can be finite and need not be periodic if the auxiliary register and counters are properly preset at the beginning of the correlation period. The unnormalized correlation function is given by the expression:

$$\phi(j) = \sum_{i=1}^{n} \alpha_i \beta_{j-i+1}, j = 1, 2, \ldots$$

where subscripts on $\beta$ are taken modulo N. If the signal representation is such that $+1$ is encoded as a binary 0 and $-1$ as a binary 1, then the cross-correlation function may be written $0(j) = n - 2F(j)$, where the derived correlation function $F(j)$ is given by $$F(j) = \sum_{i=1}^{n} (a_i \oplus b_{j-i+1})$$

where the symbol $\oplus$ indicates Exclusive-OR addition, and where $a_i = (1-\alpha_i)/2$ and $b_j = (1-\beta_j)/2$. Thus, the correlation process may be viewed as one in which a fixed, $n$-digit binary sequence $a = (a_1, a_2, \ldots a_n)$ is combined in Exclusive-OR fashion, digit-by-digit, with a longer, shifting binary sequence $b = (b_1, b_2, \ldots b_N, b_1, \ldots )$ of period N, and the weight (number of 1's) in the result is determined for each value of $j$, the number of shifted digit positions.

In the array H shown in the FIGURE, the sequence $a$ is stored in register A, with digit $a_1$ at the left end. The sequence $b$ is gradually shifted through register B, one digit shift per clock $c$, starting with digit $b_1$. After $j$ shifts, the contents of the two registers appear as shown in the A and B registers. For each shifted position, corresponding pairs of digits contained in the registers A and B are combined in Exclusive-OR fashion by gates 30 to generate the set of signals $x = (x_1, x_2, \ldots x_n)$, where $x_i = a_i \oplus b_{j-i+1}$, which is fed to the top edge of the array H.

The purpose of the array H is to add in binary counting fashion the total number of 1's that are incident upon it along its upper edge. This summation is accomplished by arranging each column of the array to contain the circuitry of a parallel (i.e., combinational) adder that adds either 0 or 1 (whichever input is incident at the top of the column) to the multi-digit input received from the previous column, to produce the multi-digit output fed to the column to the right. (The least-significant digit is at the top). All 0's are introduced into the first column at the left edge of the array. The binary number that is emitted from the rightmost column of the array H is therefore equal to the count of the total number of 1's injected along the top edge, provided only that the number $m$ of rows is large enough to represent the maximum value of this sum—that is, provided that $m \geq [log_2(n)]$ where the square brackets donate one more than the integer part of the quantity within.

This column summation may be performed in the H array by using in each column a set of $m$ identical cells 32, each of which is simply a half-adder or other means for performing elementary binary addition. As indicated, the sum (Exclusive-OR) of its two inputs $(x,z)$ passes to the right of the cell to the next column, and the product (AND) of these same two inputs passes out of the bottom to the cell below as a carry digit.

As a result, the derived correlation function $F(j)$ is generated combinationally and synchronously as the input sequence is received. In view of the assumed periodic nature of this input sequence, the first several values of $F(j)$ will be incorrect, until register B fills up with data. Eventually, however, $F(j)$ itself will exhibit the same periodicity as does the sequence $b$.

The other registers shown in FIG. 1 are not used to generate $F(j)$, but serve only to determine the height and location of the peak in the correlation function. Register U searches for the height of this peak, as follows. Assume that the set of flip-flops that form the U-register contain, at a particular instant of time $j-1$, the largest value $U(j-1)$ encountered so far in the correlation function $F(j)$. That is, $$U(j-1) = MAX [F(1), F(2), \ldots F(j-1)].$$

The downward-connected cascade of majority gates 36 in these U-cells 34 constitutes the logic for a parallel comparator of binary numbers. With a 0 injected into the top of the cascade $k$, as shown, a 1-output will appear at the bottom on lead $K_o$ when and only when the binary-number input $F(j)$ from the H array is strictly greater than the binary number $U(j-1)$ currently stored in the U-register. When $k_o = 1$ this 1-output is then used to gate a clock $c$ into the register along clock line $g$, so that the contents of the U-register are replaced by the new value $F(j)$. When $k_o = 0$, indicating that $F(j) \leq U(j-1)$, then the clock $c$ is inhibited, and the contents of the U-register remain the same as before. Thus, $$U(j) = MAX [F(j), U(j-1)]$$
$$= MAX [F(1), F(2), \ldots F(j)]$$

By induction, then, the value contained in the U-register after at least one period of the sequence $b$ has passed out of register B is just the peak value of the correlation function within the period.

The T-register serves to store the abscissa value $j$ corresponding to this peak value of $F(j)$ stored in register U. This is done by using the same gated clock line $g = k_o c$ as was applied to register U, to gate into the flip-flops of the T-register the contents of counter V, whenever the contents of register U are replaced by a new value. The counter V itself advances by one with every clock pulse $c$. Thus, register T would hold the value $j$ that corresponds to each new value $F(j)$ entered into register U. At any time, therefore, it holds the time value of the most recent upward change in the value of the function. The counter V and both the U and T registers are assumed to be reset to all 0's at the beginning of the period of evaluation of the correlation function — ostensibly the reference point in time (time zero).

With the circuitry shown, the occurrence of two identical peak values in the correlation function causes the T-register to contain the value of $j$ corresponding to the first peak, since the majority-gate comparator produces a 0-output (no change) when the numbers being compared are equal. If the abscissa value of the second peak (or the last peak, if there are more than two equivalued peaks) is perferred for any reason, then a 1 instead of a 0 should be injected into the top of the U-register on the $k$ line. This causes the comparator to behave just as before when its inputs are unequal, but to generate a 1-output when its inputs are equal to one another.

As described, the H array computes the derived correlation function $F(j)$ instead of the original correlation function $O(j)$. To compute the latter function instead, which is given by the expression:

$$O(j) = n - 2F(j),$$

we modify the output signals from the U-register 16 (or from the array 10, if no U-register is used). Assume without loss of generality that $n$ is equal to the maximum value that can be accommodated by an $m$-rowed array — i.e., $n = 2^m - 1$. Then the above relation may be written $$O(j) = -2(F(j) - 2^{m-1}) - 1,$$

which indicates that one needs to (1) subtract $2^{m-1}$ from $F(j)$, then (2) negate the result, and finally (3) double and subtract one. Using for $O(j)$ a 2's-complement number system(in which numbers between 0 and $2^m$ are represented normally but numbers between $-1$ and $-2^m + 1$ are represented as their binary complements, plus one), these three steps require that one proceed as follows: (1) subtract $2^{m-1}$ from $F(j)$, then (2) complement, and (3) double and add one. As indicated in the FIGURE, the subtraction may be performed by adding the binary number $-2^{m-1} = (1\ 0\ 0\ \ldots\ 0\ 0\ 0)$ to the output of the U-register — that is, by complementing the lowermost digit, and neglecting any carry produced. The complementation may be carried out by reading out the binary complement of the resultant number, through inverters 38. Thus, the lowermost digit undergoes no net complementation. The doubling may be accomplished by merely shifting this same output downward one row (digit position), and the addition of one by inserting a fixed 1 in place of the least-significant (topmost) digit.

It should be emphasized that the usual virtues of a cellular form for the circuitry are all realized in the present case. Namely, this circuit structure is well-adapted to realization by large-scale-integrated circuit technology, particularly that currently under development and expected to reach a stage of perfection in the near future.

Such cellular arrays are much more easily fabricated (including circuit design, layout, actual manufacture, and testing) than are relatively unstructured interconnections of gates of comparable size. They also exhibit a very high speed, despite the long chains of gates along rows and columns of the array, and unusually high reliability and component packing density, since all design effect may be concentracted on a single cell.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A cellular correlation array for determining the cross-correlation between two binary sequences comprising:
   means for storing a first binary sequence, said sequence being of a particular length $n$;
   shift register means for shifting a second, repetitious binary sequence, having a period N times said first binary sequence coupled to said storing means;
   comparing means coupled to said storing means and said shift register means for comparing said first binary sequence with a corresponding length of said second sequence to provide outputs which are a function of a correlation;
   counting array means coupled to said comparing means for totaling the outputs of said comparing means wherein an output of said counting array means represents a correlation function peak;
   means for determining at which time the correlation function peak ends;
   output means coupled to said time determining means and to said counting array means for providing the correlation function peak and the time at which the peak occurred.

2. The cellular correlation array of claim 1 wherein said means for determining at which time the correlation function peak ends comprises at storage register.

3. The cellular correlation array of claim 1 wherein said comparing means comprises exclusive-OR logic to provide a multiplying function in the correlation process.

4. The cellular correlation array of claim 1 wherein said counting array means comprises an array of columns and rows of interconnected cells each of said cells being capable of performing elementary binary addition.

5. The cellular correlation array of claim 1 wherein the counting array means comprises a storage register having a plurality of stages in which each stage is coupled to the next stage by majority logic.

6. The cellular correlation array of claim 1 wherein each of said cells has a first and second input, wherein a first output is produced by means for ANDING said first and second inputs and a second output is the product of exclusive-OR means of said first and second inputs.

7. A device for determining the maximum value of a binary function and its time of occurrence comprising:
   a first shift register means for storing the value of said binary function, said first shift register means comprising a plurality of cells;
   each cell including a bistable storage device having a first and second output and a majority logic gate;
   a second shift register means for storing the time of occurrence of each change of said binary function being coupled to said second output of said plurality of cells;
   clock means coupled to said first and second shift register for continuously supplying clock pulses;
   a first input of said bistable storage device being representative of one binary bit of said binary function being connected to said majority logic gate;
   a second input of said bistable storage device being connected to the output of the majority logic gate of the previous cell;
   said first output of said bistable device being connected to said majority logic gate;
   a third input being connected to said bistable storage device and said second shift register for gating said bistable storage device to receive said first input and to advance said second shift register by one clock pulse respectively when the value of said binary function is of a value greater than the previously stored value.

* * * * *